United States Patent
Persico et al.

(10) Patent No.: US 7,283,851 B2
(45) Date of Patent: Oct. 16, 2007

(54) POWER SAVING MODE FOR RECEIVER CIRCUIT BLOCKS BASED ON TRANSMITTER ACTIVITY

(75) Inventors: Charles J. Persico, Rancho Santa Fe, CA (US); Vladimir Aparin, San Diego, CA (US); Yue Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 506 days.

(21) Appl. No.: 10/992,393

(22) Filed: Nov. 17, 2004

(65) Prior Publication Data

US 2005/0221790 A1  Oct. 6, 2005

Related U.S. Application Data

(60) Provisional application No. 60/559,800, filed on Apr. 5, 2004.

(51) Int. Cl.
*H04B 1/38* (2006.01)
*H04B 1/16* (2006.01)
*H04M 1/00* (2006.01)

(52) U.S. Cl. .................. 455/574; 455/127.1; 455/343.1

(58) Field of Classification Search ................ 455/574, 455/572, 573, 127.1, 127.5, 343.1, 343.5, 455/343.3, 550.1, 522
See application file for complete search history.

(56) References Cited

U.S. PATENT DOCUMENTS 5,465,400 A * 11/1995 Norimatsu ................... 455/76
5,541,929 A * 7/1996 Jokura ......................... 370/337
5,778,026 A * 7/1998 Zak ............................. 375/219
5,815,821 A   9/1998 Pettersson .................... 455/575
5,999,830 A * 12/1999 Taniguchi et al. ........... 455/574
6,049,532 A * 4/2000 Steele et al. ................. 370/311
6,311,048 B1  10/2001 Loke ......................... 455/245.1
6,968,220 B2 * 11/2005 Piazza ......................... 455/574
7,136,666 B2 * 11/2006 Charriere et al. ........... 455/522
2002/0018516 A1 * 2/2002 Mizuguchi ................... 375/130
2002/0022455 A1 * 2/2002 Salokannel et al. ........... 455/68
2002/0155852 A1 * 10/2002 Bender ........................ 455/522

FOREIGN PATENT DOCUMENTS

GB      2362523      11/2001

* cited by examiner

*Primary Examiner*—Sonny Trinh
(74) *Attorney, Agent, or Firm*—Howard H. Seo; Thomas R. Rouse (57) ABSTRACT

To reduce power consumption, receiver circuit blocks within a wireless device are biased with less current whenever possible while still achieving the desired performance. The receiver circuit blocks may include a voltage controlled oscillator (VCO) that generates an oscillator signal used for frequency downconversion of a received signal from the forward link, a low noise amplifier (LNA) that amplifies the received signal, and a mixer that frequency downconverts the received signal. The VCO may be biased with less current if phase noise performance is less stringent, e.g., when (1) the wireless device is not transmitting on the reverse link, (2) a large amplitude jammer is not detected, and/or (3) the received signal level is sufficiently high. The bias currents of other receiver circuit blocks may also be adjusted based on transmitter activity, detected jammer, and/or received signal level.

30 Claims, 7 Drawing Sheets

POWER SAVING MODE FOR RECEIVER CIRCUIT BLOCKS BASED ON TRANSMITTER ACTIVITY

CLAIM OF PRIORITY UNDER 35 U.S.C. §119

The present Application for Patent claims priority to Provisional Application No. 60/559,800 entitled "Power-Saving Mode of VCO" filed Apr. 5, 2004, and hereby expressly incorporated by reference herein.

BACKGROUND

I. Field

The present invention relates generally to electronics, and more specifically to techniques for reducing power consumption by receiver circuit blocks in a wireless communication device.

II. Background

A wireless device in a wireless full-duplex communication system can simultaneously transmit and receive data for two-way communication. One such full-duplex system is a Code Division Multiple Access (CDMA) system that is widely deployed in many parts of the world. For data transmission, a transmitter within the wireless device modulates data onto a transmit (TX) local oscillator (LO) signal to generate a TX modulated signal and further amplifies the TX modulated signal to generate a transmit signal having the proper signal level. The transmit signal is then routed via a duplexer and transmitted from an antenna to one or more base stations. For data reception, a receiver within the wireless device obtains a received signal via the antenna and duplexer and further amplifies, filters, and frequency downconverts the received signal with an RX LO signal to generate baseband signals. The baseband signals are conditioned, digitized, and further processed to recover data transmitted by the base stations.

For a fill-duplex wireless device, the transmitter and receiver may both be active at the same time, and the circuit blocks in the receiver may be subjected to interference from the transmitter. A portion of the transmit signal typically leaks from the duplexer to the receiver. The leaked signal, which is commonly called a TX leakage signal or a TX feed-through signal, may degrade the performance of the receiver circuit blocks. To achieve the desired performance in the presence of the TX leakage signal, the receiver circuit blocks are often biased with large amounts of current. If the wireless device is portable and powered by an internal battery, then the high bias current may significantly deplete battery power and reduce both talk time and standby time.

There is therefore a need in the art for techniques to reduce power consumption by receiver circuit blocks in a wireless device.

SUMMARY

Techniques for reducing power consumption by receiver circuit blocks within a wireless device, while still achieving the desired performance, are described herein. The bias currents of the receiver circuit blocks are normally set high to ensure that the wireless device can achieve the desired performance even under the worst case operating environment. This worst case operating environment may correspond to (1) the wireless device transmitting on the reverse link, (2) a large interfering signal (or "jammer") being present on the forward link, and (3) the signal received via the forward link having a low signal level and possibly being close to the receiver noise floor. The conditions that result in the worst case operating environment may be present only a small fraction of the time. The bias currents of the receiver circuit blocks may then be reduced based on the operating conditions detected for the wireless device.

As an example, a voltage controlled oscillator (VCO) is often employed to generate an oscillator signal used for frequency downconversion of the received signal from the forward link. The VCO may be biased with less current if phase noise performance is less stringent under certain operating conditions. For example, less bias current may be used for the VCO when (1) the wireless device is operating in a receive-only mode and the transmitter is turned off, (2) a large amplitude jammer is not detected, and/or (3) the received signal level is sufficiently high and the receiver is operating well above sensitivity. The bias currents of the VCO as well as other receiver circuit blocks may be adjusted based on transmitter activity, detected jammer, received signal level, and so on.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The power saving techniques described herein may be used for various wireless full-duplex communication systems. For clarity, these techniques are described below for a CDMA system.

Figure 1:
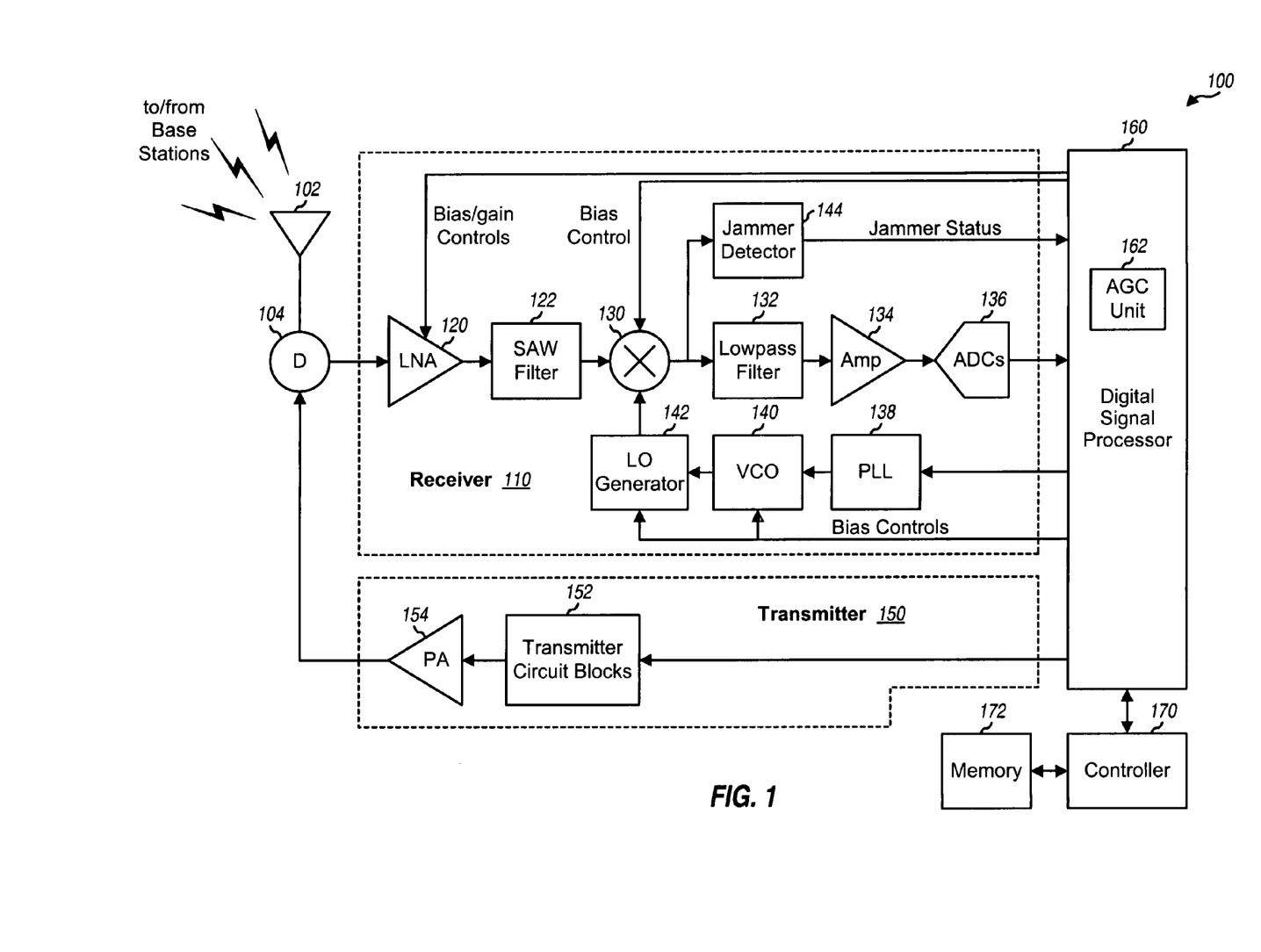
FIG. 1 shows a block diagram of a wireless device.

FIG. 1 shows a block diagram of a wireless device 100 capable of providing wireless full-duplex communication with one or more base stations via the forward and reverse links. Wireless device 100 may also be called a mobile station, a user terminal, a subscriber unit, a handset, or some other terminology. Wireless device 100 may also be a portable unit such as a cellular phone, a handheld device, a wireless module, a personal digital assistant (PDA), and so on. The forward link (or downlink) refers to the communication link from the base stations to the wireless device, and the reverse link (or uplink) refers to the communication link from the wireless device to the base stations.

On the receive path, a radio frequency (RF) signal is received by an antenna 102, routed through a duplexer (D) 104, and provided to a receiver 110. Within receiver 110, the receiver input signal is amplified by an LNA 120, filtered by a surface acoustic wave (SAW) or equivalent filter 122, and frequency downconverted from RF to baseband by a mixer 130. The downconverted signal is then filtered by a lowpass filter (LPF) 132, amplified by an amplifier (Amp) 134, and digitized by one or more analog-to-digital converters (ADCs) 136 to generate one or more streams of samples. The sample stream(s) are provided to a digital signal processor (DSP) 160 for further processing.

A VCO 140 generates an oscillator signal having the proper frequency, which may be, e.g., two times or four times the center frequency of a desired signal in the received signal. An LO generator 142 receives the oscillator signal from VCO 140 and generates an LO signal used by mixer 130 for frequency downconversion. LO generator 142 may divide the oscillator signal, e.g., by two or four to generate the LO signal. LO generator 142 typically generates inphase (I) and quadrature (Q) LO signal components for quadrature frequency downconversion, which is commonly performed. A phase locked loop (PLL) 138 receives channel frequency information from DSP 160 and generates a VCO control that adjusts the oscillation frequency of VCO 140. A jammer detector 144 detects for the presence of jammer in the received signal and is described below.

On the transmit path, DSP 160 processes data to be transmitted and provides a stream of chips to a transmitter 150. Within transmitter 150, circuit blocks 152 process (e.g., convert to analog, filter, amplify, and frequency upconvert) the stream of chips to generate a TX modulated signal. A power amplifier (PA) 154 then amplifies the TX modulated signal and provides a transmit signal, which is routed through duplexer 104 and transmitted from antenna 102 to one or more base stations.

A controller 170 directs the operation of DSP 160 and possibly other processing units within wireless device 100, which are not shown in FIG. 1 for simplicity. A memory unit 172 stores program codes and data used by controller 170 and/or DSP 160.

FIG. 1 shows a specific receiver design. In general, the conditioning of the receiver input signal may be performed by one or more stages of amplifier, filter, mixer, and so on. The receiver circuit blocks may be arranged differently from the configuration shown in FIG. 1. FIG. 1 also shows a direct downconversion design whereby the receiver input signal is downconverted directly from RF to baseband. A superheterodyne design would perform frequency downconversion in multiple stages, e.g., from RF to an intermediate frequency (IF), and then from IF to baseband. Receiver 110 and/or transmitter 150 may be implemented on one or more RF integrated circuits (RFICs) and/or with discrete components (e.g., SAW filter 122 is typically a discrete component).

Figure 2:
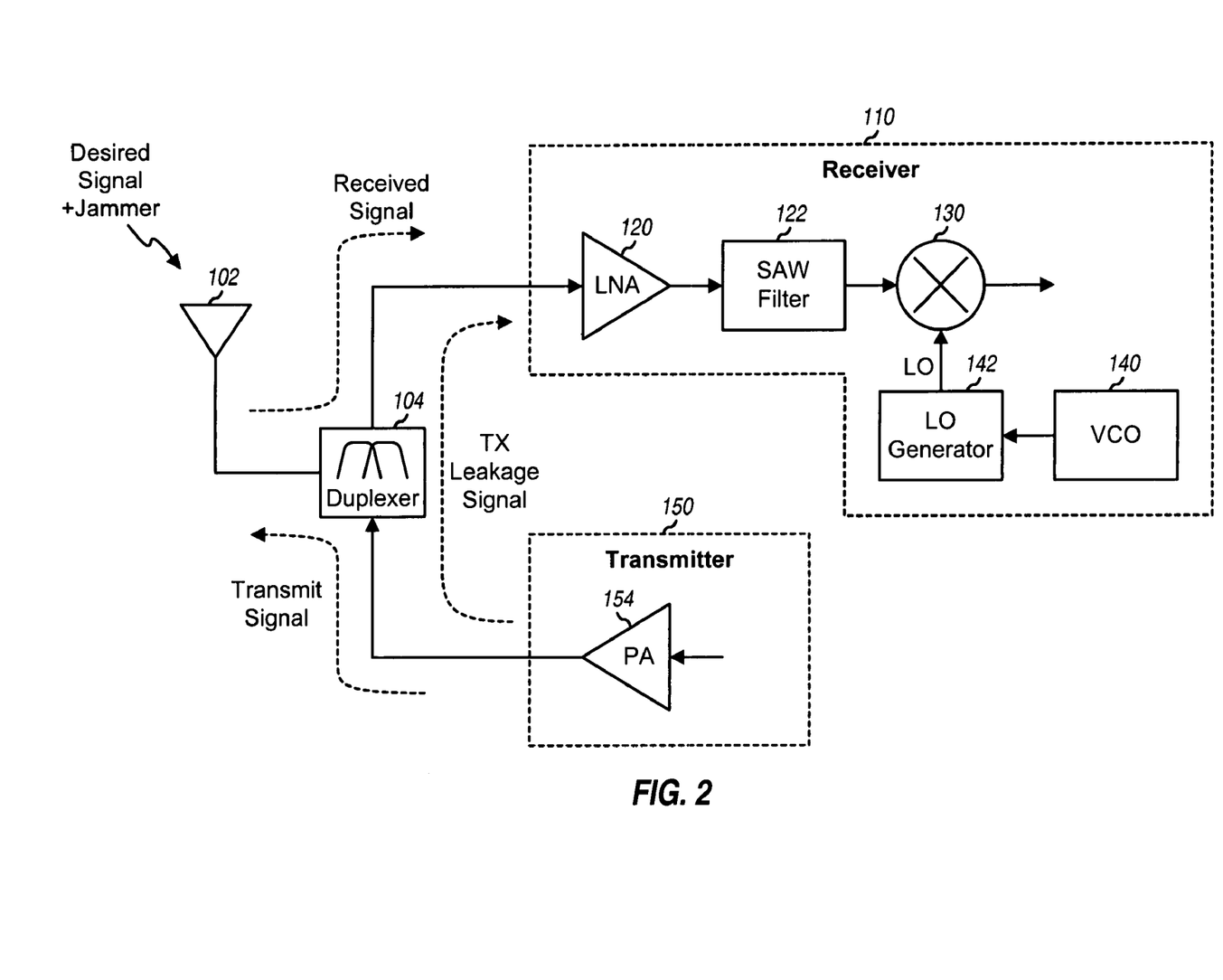
FIG. 2 shows the transmit and receive paths within the wireless device.

FIG. 2 shows the signal flows for the transmit and receive paths within wireless device 100. On the transmit path, power amplifier 154 within transmitter 150 receives and amplifies the TX modulated signal and provides the transmit signal. The transmit signal is routed through duplexer 104 and transmitted from antenna 102. A portion of the transmit signal also couples or leaks through duplexer 104 to the receive path. The amount of TX leakage is dependent on the isolation between the transmit and receive ports of duplexer 104, which may be approximately 50 decibels (dB) for a SAW duplexer at cellular band. Lower TX-to-RX isolation results in higher level of TX leakage.

On the receive path, the received signal containing a desired signal and possibly a jammer is received via antenna 102, routed through duplexer 104, and provided to LNA 120 within receiver 110. LNA 120 also receives a TX leakage signal from the transmit path, amplifies the receiver input signal (which contains the received signal and the TX leakage signal), and provides an amplified RF signal. SAW filter 122 filters the amplified RF signal to remove out of band signal components (e.g., the TX leakage signal) and provides a filtered RF signal. Mixer 130 frequency downconverts the filtered RF signal with the LO signal from LO generator 142 and provides the downconverted signal.

Figure 3A:
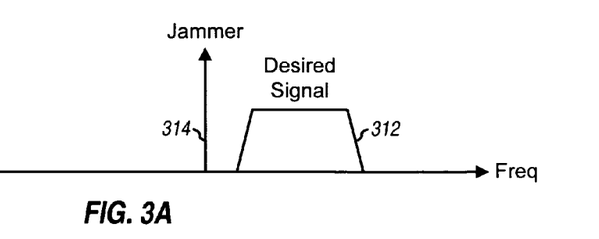
FIGS. 3A through 3C show signals at various points within the receiver.

FIG. 3A shows the received signal, which includes a desired signal 312 and a jammer 314. Jammer 314 is an undesired signal and may correspond to, for example, an RF signal transmitted by a nearby base station in an Advanced Mobile Phone Service (AMPS) system. The jammer may be much larger in amplitude than the desired signal and may be located close in frequency to the desired signal.

Figure 3B:
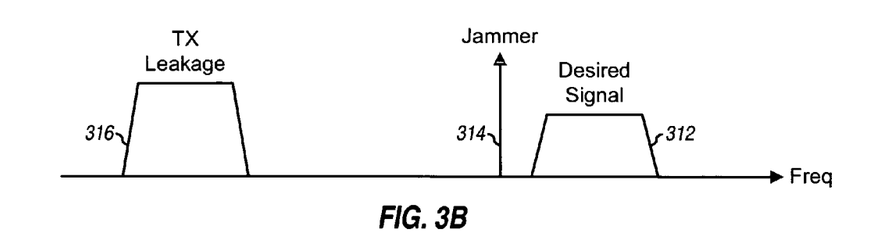

FIG. 3B shows the receiver input signal at the input of LNA 120. This signal contains desired signal 312 and jammer 314 in the received signal as well as a TX leakage signal 316 from the transmit path. The transmit signal is often much larger in amplitude than the desired signal. Consequently, the TX leakage signal may have a large amplitude relative to the desired signal even after the attenuation by duplexer 104.

Figure 3C:
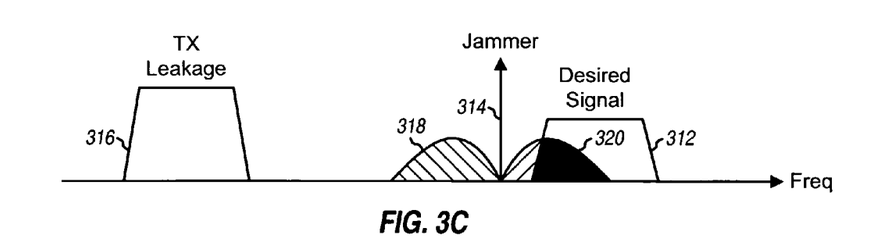

FIG. 3C shows the signal at the output of mixer 130. Non-linearity in LNA 120 and mixer 130 can cause the modulation on TX leakage signal 316 to be transferred to (narrowband) jammer 314, which then results in a widened spectrum 318 around the jammer. This spectral widening is referred to as cross modulation. A portion 320 of widened spectrum 318 may fall within the desired signal band. Portion 320 (which is shown with shading in FIG. 3C) acts as additional noise that degrades the performance of the wireless device. This noise further degrades the receiver sensitivity so that the smallest desired signal that can be reliably detected by the receiver needs to have a larger signal level.

The active circuit blocks within receiver 110 (e.g., LNA 120, mixer 130, and VCO 140) may be designed to provide the required performance in the presence of the TX leakage signal and/or large amplitude jammer. For example, VCO 140 may be designed to have good phase noise performance in order to meet general phase noise requirements for meeting system carrier-to-noise (C/N) needs. Integrated phase noise may be allocated a portion of the C/N budget and may be relaxed as the desired signal level increases. In addition, phase noise at jammer frequency offsets creates reciprocal mixing with jammer and folds in-band, thereby degrading C/N. This reciprocal mixing mechanism drives the out-of-band phase noise requirements or mask. The reciprocal mixing is the reason why phase noise needs to be good in the presence of close-in jammers, since poor phase noise may cause the receiver to fail tests. The system C/N is especially difficult to meet when the TX leakage signal is present. VCO 140 and LO generator 142 may be biased with large amounts of current in order to meet the worst-case phase noise requirements.

Furthermore, the receiver performance is determined by a combination of LNA cross modulation and/or desense, mixer cross modulation and/or desense, and reciprocal mixing caused by phase noise. The linearity of an active circuit block determines the amount of cross modulation generated by the circuit block. LNA 120 and/or mixer 130 may thus be biased with large amounts of current to meet applicable requirements for linearity. The large amounts of bias current for the receiver circuit blocks consume battery power and shorten both talk time and standby time.

To reduce power consumption, the receiver circuit blocks may be biased with less current whenever possible. VCO 140 may be biased with less current if phase noise performance is less stringent under certain operating conditions. For example, the phase noise requirement may be relaxed when (1) the wireless device is operating in a receive-only mode and the transmitter is turned off, (2) a large amplitude jammer is not detected, and/or (3) the receiver is operating well above sensitivity and the gain of LNA 120 has been reduced because of a relatively high received signal level. If the transmitter is turned off or jammers are not present, then the reciprocal mixing can be given more budget to meet the system C/N. LNA 120 may have multiple gain steps, and each gain step may be used for a different range of received signal levels. The received signal level may be deemed to be sufficiently high if certain LNA gain steps are selected. In any case, the bias currents of VCO 140 and LO generator 142 may be linked to, and adjusted based on, transmitter activity, detected jammer, LNA gain step, and so on. If the worst-case conditions that drive the stringent phase noise requirements are not present, then the bias currents of VCO 140 and LO generator 142 may be reduced to save power while still meeting system performance. The bias currents of the other receiver circuit blocks may be adjusted in similar manner based on the operating conditions of the wireless device to reduce power consumption.

Referring back to FIG. 1, DSP 160 and/or controller 170 have knowledge as to when transmitter 150 is active and transmitting on the reverse link to the base station(s). Jammer detector 144 detects for the presence of a jammer in the received signal and provides a jammer status signal to DSP 160. An automatic gain control (AGC) unit 162 within DSP 160 adjusts the gain of LNA 120 such that baseband signals with the proper signal level are provided to ADCs 136. AGC unit 162 may also adjust the gain of other variable gain circuit blocks in the receive path, but this is not shown in FIG. 1 for simplicity. DSP 160 and/or controller 170 thus have all of the pertinent information that may be used to adjust the bias currents of VCO 140, LO generator 142, LNA 120, and mixer 130. DSP 160 can generate bias control signals for VCO 140, LO generator 142, LNA 120, and mixer 130 based on the operating conditions for the wireless device.

Figure 4:
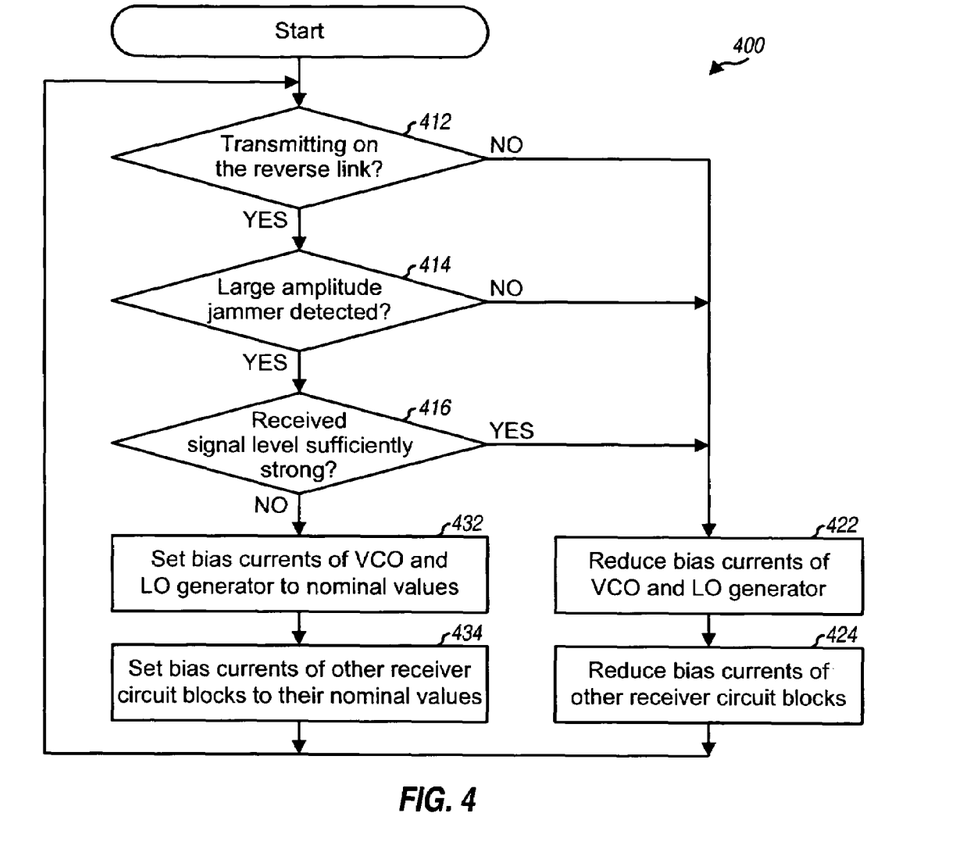
FIG. 4 shows a process to adjust the bias currents of the receiver circuit blocks.

FIG. 4 shows a flow diagram of a process 400 performed by the wireless device to adjust the bias currents of various receiver circuit blocks in order to conserve battery power. The wireless device determines whether it is transmitting on the reverse link (block 412), whether a large amplitude jammer has been detected on the forward link (block 414), and/or whether the received signal level is sufficiently strong (block 416). The amplitude as well as the frequency offset of the jammer are considered since a closer in jammer (e.g., at 900 kHz offset) is more harmful than an equal amplitude jammer at a greater frequency offset. In fact, once the jammer is past a certain frequency offset (e.g., 1.5 MHz offset for CDMA), cross modulation is not an issue since no energy would fall in-band on the desired signal and the phase noise is rolling off at approximately 20 dB/decade until it hits the noise floor. Thus reciprocal mixing is reduced as phase noise rolls off. Blocks 412, 414, and 416 detect for different operating conditions for the wireless device. During a voice call, the transmitter may be active for only a portion (e.g., half) of the time and/or may be transmitting at low power. The TX leakage signal may thus be non-existent or small. For most operating environments, a large amplitude jammer may be present for only a small percentage of the time, and the received signal level may be sufficiently strong for a large percentage of the time. Thus, the likelihood of getting a 'No' answer for either block 412 or 414 or a 'Yes' answer for block 416 may be high.

If the wireless device is not transmitting on the reverse link, or a large amplitude jammer is not detected, or the received signal level is sufficiently high, then the bias currents of the VCO and the LO generator are reduced since the phase noise requirements may be relaxed (block 422). The amount of bias current may also be set proportional to the amount of transmit power used for the reverse link transmission (e.g., more bias current for higher transmit power level). The bias currents of other receiver circuit blocks (e.g., the LNA and the mixer) may also be reduced (block 424). The wireless device operates in the power save mode when the bias currents of the receiver circuit blocks are reduced.

If the wireless device is transmitting and a large amplitude jammer has been detected and the received signal level is not sufficiently high, then the bias currents of the VCO and the LO generator are set to their nominal values (which are higher than the reduced values) in order to meet the phase noise requirements (block 432). The bias currents of other receiver circuit blocks may also be set to their nominal (higher) values to meet the required performance (block 434). The wireless device operates in the normal mode when the bias currents for the receiver circuit blocks are set to their nominal values.

The wireless device may periodically determine its operating conditions (e.g., every frame of 10 milliseconds) and may then set or adjust the bias currents of the receiver circuit blocks accordingly. Each condition may be detected by a respective unit that may provide an indication whenever the condition occurs. The wireless device may then set or adjust the bias currents accordingly whenever a change in any one of the conditions is detected.

FIG. 4 shows a specific bias current adjustment scheme. In general, the wireless device may detect for any number of conditions indicative of the operating environment of the wireless device. FIG. 4 shows some exemplary conditions, and the wireless device may detect for other conditions not shown in FIG. 4. FIG. 4 also shows an exemplary logic for adjusting the bias current. In general, the bias current adjustment for each receiver circuit block may be based on any function of the detected conditions. The bias current may be adjusted in coarse steps. For example, a high bias current may be used if a given condition is detected and a low bias current may be used otherwise. The bias current may also be adjusted in smaller increments based on, e.g., the actual transmit power level used for the reverse link transmission, the amplitude of the detected jammer, the signal level of the received signal, and so on.

The receiver circuit blocks may be implemented with various circuit designs. Furthermore, the bias currents for these receiver circuit blocks may be adjusted in various manners. For clarity, exemplary designs for the VCO, LNA, and mixer with complementary metal oxide semiconductor (CMOS) circuits are described below.

Figure 5:
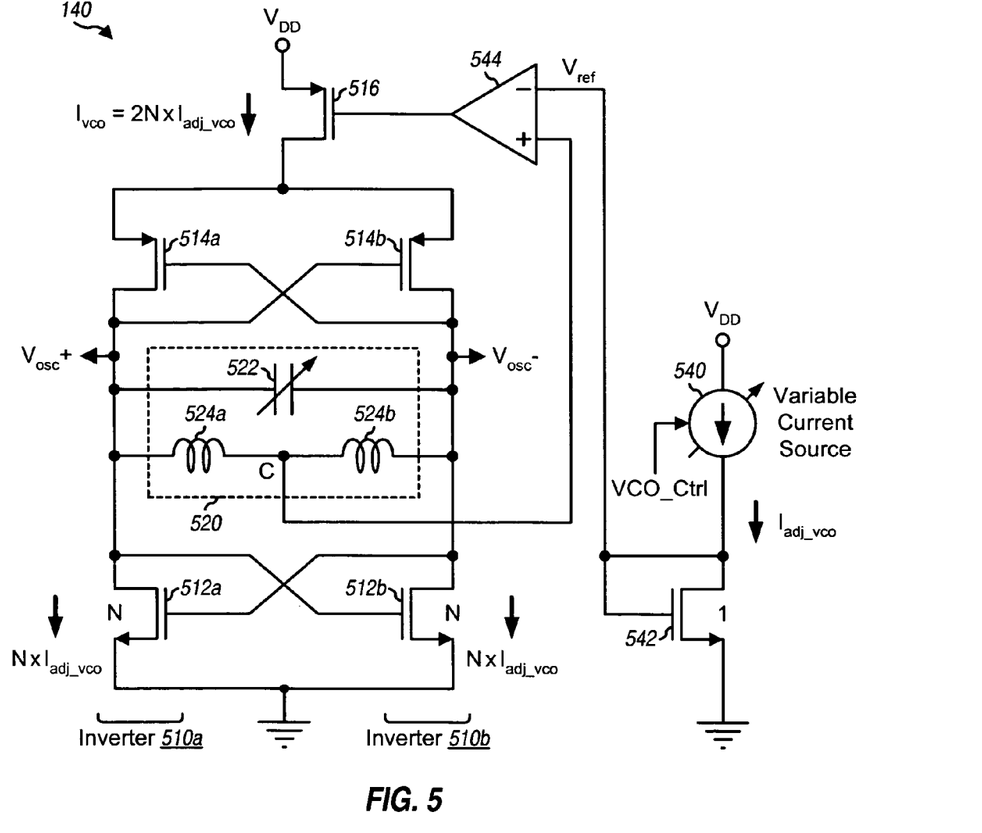
FIG. 5 shows a schematic diagram of a VCO.

FIG. 5 shows an embodiment of VCO 140 within receiver 110. VCO 140 includes two inverters 510a and 510b that are cross-coupled such that the output of one inverter couples to the input of the other inverter. Each inverter 510 is formed by an N-channel field effect transistor (N-FET) 512 coupled in series with a P-channel FET (P-FET) 514. A tank circuit 520 is formed by a variable capacitor (varactor) 522 and two series-coupled inductors 524a and 524b. Tank circuit 520 determines the oscillation frequency of VCO 140 and is coupled to the drains of N-FETs 512a and 512b. A P-FET 516 couples to the sources of P-FETs 514a and 514b and provides a bias current of $I_{VCO}$ for both inverters 510a and 510b.

A variable current source 540 provides an adjustable current of $I_{adj\_vco}$ based on a VCO bias control (VCO_Ctrl) signal. An N-FET 542 is diode-connected and has its drain and gate coupled together. The gate of N-FET 542 provides a reference voltage $V_{ref}$ to an inverting input of an operational amplifier (op-amp) 544. Op-amp 544 has its non-inverting input coupled to a common node C between inductors 524a and 524b and its output coupled to the gate of P-FET 516.

Op-amp 544 is part of a feedback loop that adjusts the bias currents of inverters 510a and 510b to be proportional to the adjustable current $I_{adj\_vco}$ from variable current source 540. N-FET 516 provides signal inversion within the feedback loop, and hence node C is coupled to the non-inverting input instead of the inverting input of op-amp 544. At direct current (DC), inductors 524a and 524b are electrical shorts, each of N-FETs 512a and 512b is diode-connected, and the feedback loop maintains the same gate-to-source voltage $V_{gs}$ for N-FETs 512a, 512b, and 542. If the sizes of N-FETs 512a and 512b are N times the size of N-FET 542, then the current flowing through each of N-FETs 512a and 512b is N times the current flowing through N-FET 542, or $I_{inv}=N\times I_{adj\_vco}$. The bias current of VCO 140 is equal to the sum of the bias currents for N-FETs 512a and 512b, or $I_{vco}=2\times I_{inv}=2N\times I_{adj\_vco}$. The bias current of VCO 140 may thus be adjusted by controlling the adjustable current $I_{adj\_vco}$ of variable current source 540.

Figure 6:
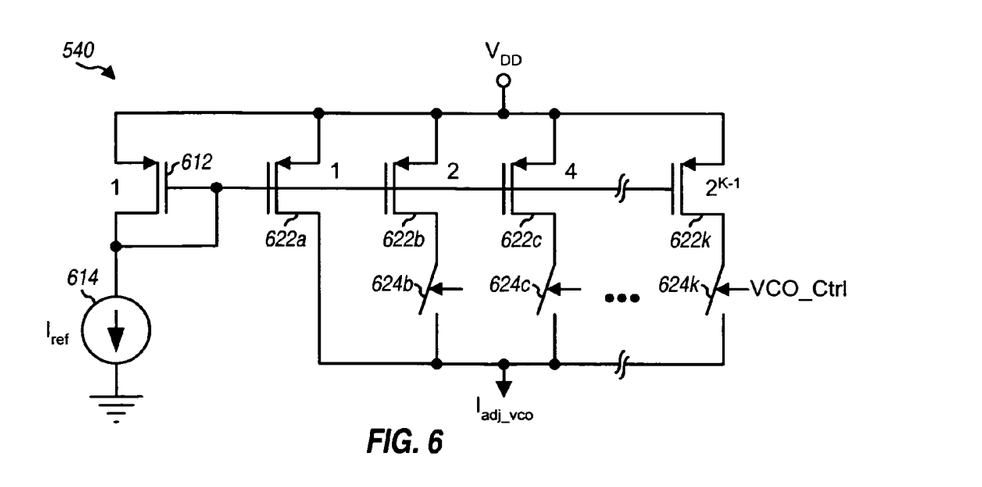
FIG. 6 shows a schematic diagram of a variable current source.

FIG. 6 shows an embodiment of variable current source 540. A P-FET 612 and a current source 614 are coupled in series and between the power supply $V_{DD}$ and circuit ground. Current source 614 provides a fixed current of $I_{ref}$ and may be implemented in various manners, as is known in the art. K P-FETs 622a through 622k are coupled in parallel with P-FET 612 and have their gates coupled together and their sources coupled to the power supply. K may be any value greater than one (i.e., K>1).

The drain of P-FET 622a couples directly to an output node that provides the adjustable current $I_{adj\_vco}$. The drains of P-FETs 622b through 622k couple to one end of switches 624b through 624k, respectively. The other end of switches 624b through 624k couples together and to the output node that provides the adjustable current $I_{adj\_vco}$. Alternatively, the drains of P-FETs 622b through 622k may be coupled directly to the output node, and the gate of each of these P-FETs may be coupled to the gate voltage of P-FET 612 via a switch that enables and disables the P-FET. The gate of each of P-FETs 622b through 622k may also be coupled to $V_{DD}$ via another switch that pulls the gate to $V_{DD}$ when the P-FET is not enabled.

The amount of current provided by each P-FET 622x, where x=a . . . k, is dependent on (1) the ratio of the size of P-FET 622x to the size of P-FET 612 and (2) the fixed current $I_{ref}$ provided by current source 614. P-FETs 622a through 622k may be designed to provide the same or different amounts of current. For the embodiment shown in FIG. 6, P-FETs 622a through 622k are binary decoded, with P-FET 622a providing a current of $I_{ref}$, P-FET 622b providing a current of $2\times I_{ref}$, and so on, and P-FET 622k providing a current of $2^{K-1}\times I_{ref}$. P-FETs 622a through 622k may also be thermometer decoded, with each P-FET 622 providing the same current of $g\times I_{ref}$, where g is the ratio of the size of P-FET 622 to the size of P-FET 612.

The bias current of VCO 140 may be adjusted in various manners. In one embodiment, the bias current of VCO 140 is adjusted based on the transmit power level used for the reverse link transmission and may be expressed as:

$$I_{vco} \propto \text{Reverse link transmit power level.} \quad \text{Eq (1)}$$

Equation (1) indicates that more bias current may be used for VCO 140 when higher transmit power is used for the reverse link transmission, and vice versa. The mapping between transmit power level to VCO bias current may be determined by computer simulation, empirical measurements, and so on. The VCO bias current may also be adjusted based on the detected jammer amplitude, the received signal level, and so on. For example, less bias current may be used for the VCO for low jammer amplitude or high received signal level, and vice versa.

In another embodiment, the bias current of VCO 140 is adjusted in coarse steps with a small number of bias current settings. As an example, if two bias current settings are available, then low bias current may be used for VCO 140 when a condition allowing for reduced bias current is detected (e.g., when the wireless device is not transmitting), and high bias current may be used otherwise (e.g., when the wireless device is transmitting).

The oscillation frequency of VCO 140 may drift when the bias current is adjusted. PLL 138 would then lock VCO 140 to the desired frequency. PLL 138 may be designed with sufficiently fast settling time so that the frequency drift due to VCO bias current adjustment may be tracked out quickly in order to minimize performance degradation.

Figure 7:
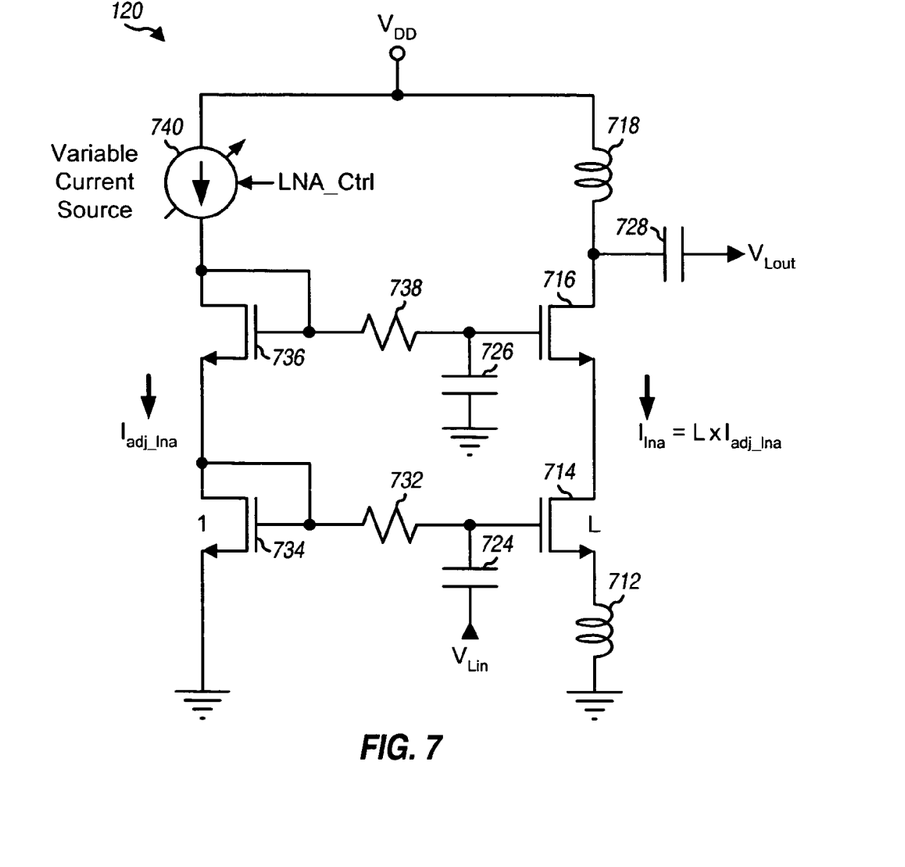
FIG. 7 shows a schematic diagram of a low noise amplifier (LNA)

FIG. 7 shows an embodiment of LNA 120 within receiver 110. Within LNA 120, N-FETs 714 and 716 are coupled in series, with the drain of N-FET 714 being coupled to the source of N-FET 716. An inductor 712 couples between the source of N-FET 714 and circuit ground. An inductor 718 couples between the drain of N-FET 716 and the power supply. A capacitor 724 has one end coupled to the gate of N-FET 714 and the other end receiving the receiver input signal $V_{Lin}$. A capacitor 726 couples to the gate of N-FET 716 and circuit ground. A capacitor 728 has one end coupled to the drain of N-FET 716 and the other end providing the amplified RF signal $V_{Lout}$. N-FETs 714 and 716 provide signal gain for LNA 120. Capacitor 724, inductor 712, and the unity-gain frequency of N-FET 714 determine the input impedance of LNA 120 (inductor 712 determines the real part of the input impedance, and capacitor 724 is used to match impedance). Capacitor 728, inductor 718, and the impedance at the drain of N-FET 716 determine the output impedance of LNA 120. Capacitors 724 and 728 also provide AC coupling for the LNA input and output, respectively.

N-FETs 734 and 736 and a variable current source 740 are coupled in series and between the power supply and circuit ground. Variable current source 740 provides an adjustable current of $I_{adj\_lna}$ based on an LNA bias control (LNA_Ctrl) signal and may be implemented, e.g., as shown in FIG. 6. Each of N-FETs 734 and 736 is diode-connected and has its drain and gate coupled together. The gate of N-FET 714 is coupled to the gate of N-FET 734 via a resistor 732, and the gate of N-FET 716 is coupled to the gate of N-FET 736 via a resistor 738. N-FETs 714 and 734 have the same gate-to-source voltage, N-FETs 716 and 736 also have the same gate-to-source voltage, and N-FETs 714 and 716 form a current mirror with N-FETs 734 and 736. The amount of current flowing through N-FETs 714 and 716 is determined by (1) the ratio of the sizes of N-FETs 714 and 716 to the sizes of N-FETs 734 and 736 and (2) the adjustable current $I_{adj\_lna}$ provided by variable current source 740, or $I_{lna} = L \times I_{adj\_lna}$ where L is the transistor size ratio.

Figure 8:
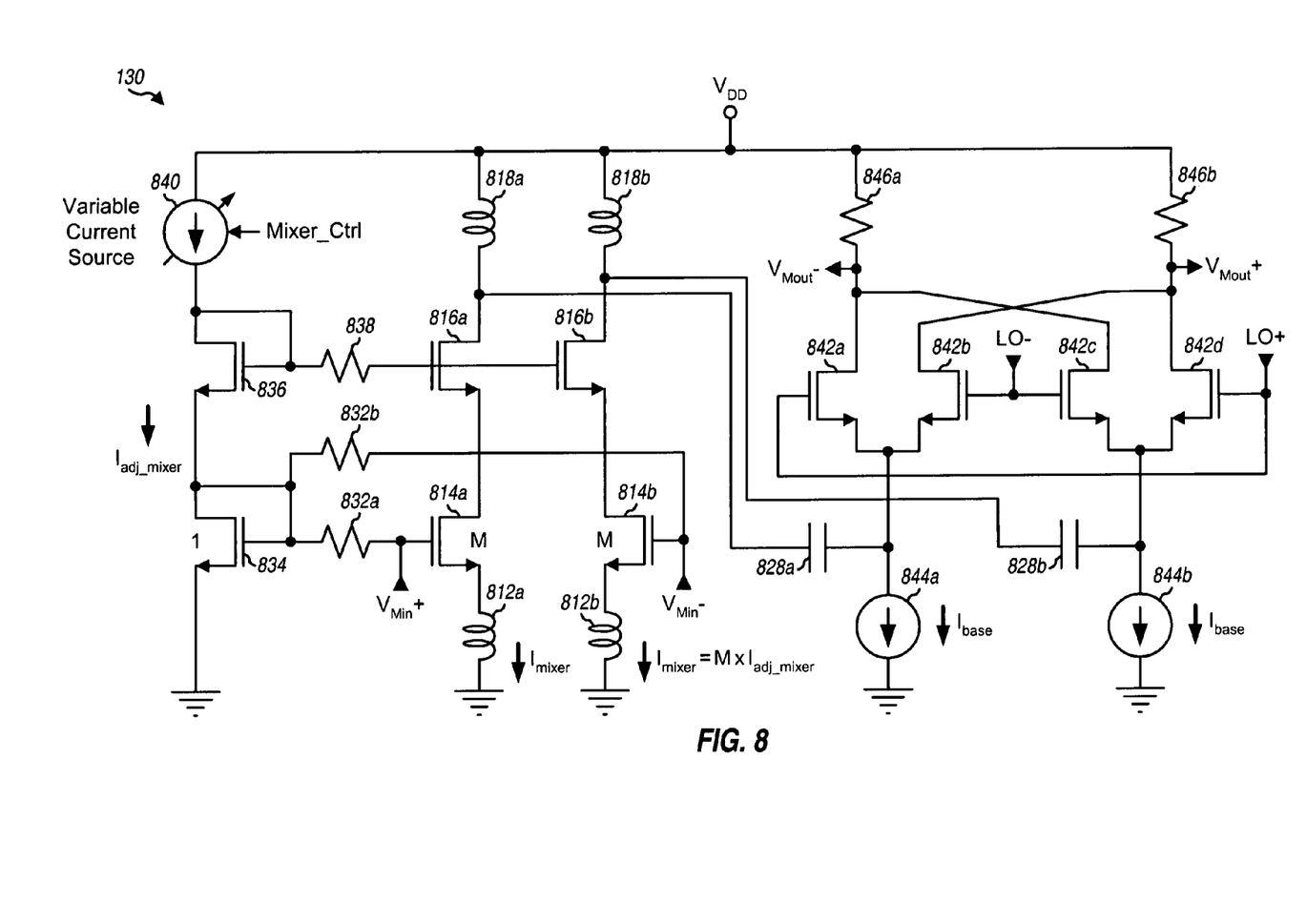
FIG. 8 shows a schematic diagram of a mixer.

FIG. 8 shows an embodiment of mixer 130 within receiver 110. Within mixer 130, N-FETs 814a and 816a and inductors 812a and 818a are coupled in series, and N-FETs 814b and 816b and inductors 812b and 818b are also coupled in series, in the same manner as N-FETs 714 and 716 and inductors 712 and 718 in FIG. 7. The gates of N-FETs 814a and 814b receive a differential input signal ($V_{Min}+$ and $V_{Min}-$) for mixer 130. N-FETs 834 and 836 and a variable current source 840 are coupled in series in the same manner as N-FETs 734 and 736 and variable current source 740 in FIG. 7. Each of N-FETs 834 and 836 is also diode-connected. The gates of N-FETs 814a and 814b are coupled to the gate of N-FET 834 via resistors 832a and 832b, respectively. The gates of N-FETs 816a and 816b are coupled to the gate of N-FET 836 via a resistor 838.

N-FETs 842a, 842b, 842c and 842d are coupled in parallel and form the switching portion of a Gilbert cell multiplier. The sources of N-FETs 842a and 842b couple together and to a current source 844a that provides a fixed current of $I_{base}$. The sources of N-FETs 842c and 842d couple together and to a current source 844b that also provides a fixed current of $I_{base}$. The gates of N-FETs 842a and 842d couple together and receive a non-inverting LO signal (LO+). The gates of N-FETs 842b and 842c couple together and receive an inverting LO signal (LO−). The drains of N-FETs 842a and 842c couple together and to a resistor 846a. The drains of N-FETs 842b and 842d couple together and to a resistor 846b. A capacitor 828a couples between the drain of N-FET 816a and the sources of N-FETs 842a and 842b. A capacitor 828b couples between the drain of N-FET 816b and the sources of N-FETs 842c and 842d. The drains of N-FETs 842a and 842d provide the differential output signal ($V_{Mout}+$ and $V_{Mout}-$) for mixer 130.

N-FETs 814a, 814b, 816a and 816b form two signal-dependent current sources for the Gilbert cell multiplier and also provide signal gain. N-FETs 842a, 842b, 842c and 842d perform switching for the Gilbert cell multiplier.

Variable current source 840 provides an adjustable current of $I_{adj\_mixer}$ based on a mixer bias control (Mixer_Ctrl) signal and may also be implemented, e.g., as shown in FIG. 6. N-FETs 814a, 814b and 834 have the same gate-to-source voltage, and N-FETs 816a, 816b and 836 also have the same gate-to-source voltage. N-FETs 814a and 816a form a first current mirror with N-FETs 834 and 836, and N-FETs 814b and 816b form a second current mirror with N-FETs 834 and 836. The amount of current flowing through each current mirror is determined by (1) the ratio of the sizes of N-FETs 814 and 816 to the sizes of N-FETs 834 and 836 and (2) the adjustable current $I_{adj\_mix}$ provided by variable current source 840, or $I_{mixer} = M \times I_{adj\_mixer}$ where M is the transistor size ratio.

The bias currents of LNA 120 and mixer 130 may be adjusted in various manners, similar to the adjustment of the VCO bias current. In one embodiment, the bias currents of LNA 120 and mixer 130 are adjusted to different amounts based on the transmit power level used for the reverse link transmission, the measured jammer amplitude, and/or the measured received signal level. In another embodiment, low bias currents may be used for LNA 120 and mixer 130 when a condition allowing for reduced bias current is detected (e.g., when the wireless device is not transmitting), and high bias currents may be used otherwise (e.g., when the wireless device is transmitting).

For clarity, FIGS. 5 through 8 show exemplary circuit designs for the VCO, variable current source, LNA, and mixer, respectively. These receiver circuit blocks may also be implemented with various other circuit designs and using CMOS or some other IC process technology. For example, the receiver circuit blocks may be implemented with bipolar junction transistors (BJTs), gallium arsenide (GaAs) transistors, hetero-junction bipolar transistors (HBTs), high electron mobility transistors (HEMTs), and so on.

Figure 9:
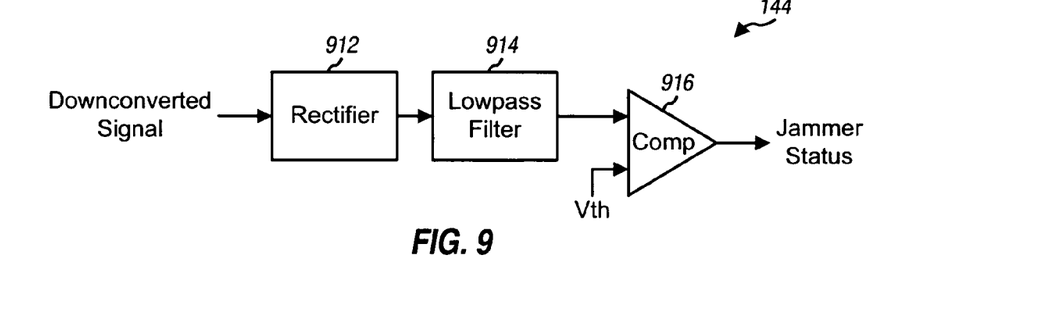
FIG. 9 shows a block diagram of a jammer detector.

FIG. 9 shows a block diagram of an embodiment of jammer detector 144 in FIG. 1. Within jammer detector 144, a rectifier 912 receives the downconverted signal from mixer 130 (which is a sinusoidal signal having both positive and negative amplitude) and converts the downconverted signal to a single-ended rectified signal having only positive amplitude. Rectifier 912 may be implemented with a diode or some other circuit design. A lowpass filter 914 filters the rectified signal and may be implemented with, e.g., a single-order lowpass filter of an appropriate bandwidth (e.g., several hundred Hertz). A comparator 916 compares the filtered signal against a threshold level (Vth) and provides the jammer status signal, which may be set to (1) logic high ('1') if the filtered signal amplitude is larger than the threshold level, indicating the presence of a large amplitude jammer, or (2) logic low ('0') otherwise. The filtered signal may be compared against a single threshold level to obtain a 1-bit jammer status signal, as shown in FIG. 9. The filtered signal may also be digitized with an ADC to obtain multiple bits of resolution for the jammer amplitude. The bias currents of various receiver circuit blocks may be adjusted based on whether a large amplitude jammer is detected and/or the measured jammer amplitude.

The power saving techniques described herein may be implemented by various means. For example, these techniques may be implemented in hardware, software, or a combination thereof. For a hardware implementation, the processing units used to adjust the bias currents of the receiver circuit blocks may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. The receiver circuit blocks themselves may be implemented on one or more RFICs.

For a software implementation, the power saving techniques may be implemented with modules (e.g., procedures, functions, and so on) that perform the functions described herein. The software codes may be stored in a memory unit (e.g., memory unit 172 in FIG. 1) and executed by a processor (e.g., controller 170). The memory unit may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A wireless apparatus in a wireless full-duplex communication system, comprising:
   a voltage controlled oscillator (VCO) operable to generate an oscillator signal used for frequency downconversion of a signal received via a forward link, the VCO having an adjustable bias current; and
   a processor operable to determine whether the wireless apparatus is transmitting on a reverse link and to adjust the bias current of the VCO based on whether the wireless apparatus is transmitting on the reverse link.

2. The apparatus of claim 1, wherein the processor is operable to select a high bias current for the VCO if the wireless apparatus is transmitting on the reverse link and to select a low bias current for the VCO if the wireless apparatus is not transmitting.

3. The apparatus of claim 1, wherein the processor is operable to adjust the bias current of the VCO proportional to transmit power used for transmitting on the reverse link.

4. The apparatus of claim 1, wherein the processor is further operable to determine whether a large interfering signal is detected on the forward link and to adjust the bias current of the VCO further based on whether the large interfering signal is detected.

5. The apparatus of claim 4, wherein the processor is operable to select a low bias current for the VCO if the large interfering signal is not detected.

6. The apparatus of claim 1, wherein the processor is further operable to determine a signal level of the signal received via the forward link and to adjust the bias current of the VCO further based on the received signal level.

7. The apparatus of claim 6, wherein the processor is operable to select a low bias current for the VCO if the received signal level is sufficiently high.

8. A wireless apparatus in a wireless full-duplex communication system, comprising:
   means for determining whether the wireless apparatus is transmitting on a reverse link; and
   means for adjusting bias current of a voltage controlled oscillator (VCO) based on whether the wireless apparatus is transmitting on the reverse link, wherein the VCO generates an oscillator signal used for frequency downconversion of a signal received via a forward link.

9. The apparatus of claim 8, wherein the means for adjusting the bias current of the VCO comprises
   means for adjusting the bias current of the VCO lower if the wireless apparatus is not transmitting on the reverse link, and
   means for adjusting the bias current of the VCO higher if the wireless apparatus is transmitting on the reverse link.

10. The apparatus of claim 8, further comprising:
    means for determining whether a large interfering signal is detected on the forward link; and
    means for adjusting the bias current of the VCO further based on whether the large interfering signal is detected.

11. The apparatus of claim 8, further comprising:
    means for determining a signal level of the signal received via the forward link; and
    means for adjusting the bias current of the VCO further based on the received signal level.

12. A method of adjusting bias current in a wireless apparatus, comprising:
    determining whether the wireless apparatus is transmitting on a reverse link in a wireless full-duplex communication system; and
    adjusting bias current of a voltage controlled oscillator (VCO) based on whether the wireless apparatus is transmitting on the reverse link, wherein the VCO generates an oscillator signal used for frequency downconversion of a signal received via a forward link.

13. An integrated circuit comprising:
    a voltage controlled oscillator (VCO) operable to generate an oscillator signal used for frequency downconversion of a signal received via a forward link in a wireless full-duplex communication system; and
    a first variable current source operative to provide an adjustable bias current for the VCO, the bias current of the VCO being adjusted based on at least one condition including whether a signal is being transmitted on a reverse link.

14. The integrated circuit of claim 13, wherein the first variable current source is operative to provide a high bias current for the VCO if a signal is being transmitted on the reverse link and to provide a low bias current for the VCO if a signal is not being transmitted on the reverse link.

15. The integrated circuit of claim 13, wherein the bias current provided by the first variable current source for the VCO is adjusted proportional to an amount of transmit power used for transmitting on the reverse link.

16. The integrated circuit of claim 13, further comprising:
    a local oscillator (LO) generator operative to receive the oscillator signal from the VCO and to generate an LO signal used for the frequency downconversion, wherein bias current of the LO generator is adjusted based on whether a signal is being transmitted on the reverse link.

17. The integrated circuit of claim 13, further comprising:
    a low noise amplifier (LNA) operative to amplify the signal received via the forward link with an adjustable gain.

18. The integrated circuit of claim 17, further comprising:
    a second variable current source operative to provide an adjustable bias current for the LNA, the bias current of the LNA being adjusted based on whether a signal is being transmitted on the reverse link.

19. The integrated circuit of claim 17, wherein the bias current provided by the first variable current source for the VCO is further adjusted based on the gain of the LNA.

20. The integrated circuit of claim 13, further comprising:
    a mixer operative to frequency downconvert the signal received via the forward link, wherein bias current of the mixer is adjusted based on whether a signal is being transmitted on the reverse link.

21. The integrated circuit of claim 13, wherein the VCO and the first variable current source are implemented with complementary metal oxide semiconductor (CMOS) circuits.

22. A wireless apparatus in a wireless full-duplex communication system, comprising:
    a processor operable to determine at least one condition indicative of an operating environment for the wireless apparatus, the at least one condition including whether the wireless apparatus is transmitting on a reverse link; and
    at least one receiver circuit block operable to process a signal received via a forward link, wherein each of the at least one receiver circuit block has an adjustable bias current that is set based on the at least one condition.

23. The apparatus of claim 22, wherein the at least one receiver circuit block includes a voltage controlled oscillator (VCO) operable to generate an oscillator signal used for frequency downconversion of the signal received via the forward link.

24. The apparatus of claim 22, wherein the at least one receiver circuit block includes a low noise amplifier (LNA) operable to amplify the signal received via the forward link.

25. The apparatus of claim 22, wherein the at least one receiver circuit block includes a mixer operable to frequency downconvert the signal received via the forward link.

26. The apparatus of claim 22, wherein the bias current for each of the at least one receiver circuit block is reduced if the wireless apparatus is not transmitting on the reverse link.

27. The apparatus of claim 22, wherein the at least one condition further includes whether a large interfering signal is detected on the forward link.

28. The apparatus of claim 27, wherein the bias current for each of the at least one receiver circuit block is reduced if the large interfering signal is not detected.

29. The apparatus of claim 22, wherein the at least one condition further includes whether signal level of the signal received via the forward link is sufficiently high.

30. The apparatus of claim 29, wherein the bias current for each of the at least one receiver circuit block is reduced if the received signal level is sufficiently high.

* * * * *